United States Patent [19]

Nozawa

[11] 3,831,181

[45] Aug. 20, 1974

[54] DEVICE FOR CONTROLLING DIAPHRAGM IN LENS OF SINGLE-LENS REFLEX CAMERA

[75] Inventor: Shozo Nozawa, Kawasaki, Japan

[73] Assignee: Ricoh Co. Ltd, Tokyo, Japan

[22] Filed: Oct. 19, 1973

[21] Appl. No.: 408,061

[52] U.S. Cl. .................................. 354/45, 354/270
[51] Int. Cl. ....................... G03b 7/12, G03b 9/02
[58] Field of Search ....................... 354/45, 270, 40

[56] References Cited
UNITED STATES PATENTS

| | | | |
|---|---|---|---|
| 3,038,399 | 6/1962 | Morelle | 354/41 |
| 3,443,496 | 5/1969 | Sauer et al. | 354/128 |
| 3,668,994 | 6/1972 | Fujii | 354/45 X |

Primary Examiner—Joseph F. Peters, Jr.
Attorney, Agent, or Firm—Cooper, Dunham, Clark, Griffin & Moran

[57] ABSTRACT

A device for automatically controlling a diaphragm in a lens of an EE type single-lens reflex camera is disclosed in which upon depression of a shutter release button, a member operatively coupled to the shutter release button releases a start lever which in turn actuates members for controlling the diaphragm. Once the start lever is actuated, a toothed stop ratchet plate is displaced to a position corresponding to the angular position of a pointer of an exposure meter to control the angle of rotation of a pawl lever which in turn controls the angle of rotation of a diaphragm control lever in engagement with a pin operatively coupled to the diaphragm in the lens, whereby the optimum aperture is set. The stroke of the shutter release member may reduced, and and the construction of a diaphragm control mechanism may be considerably simplified.

2 Claims, 1 Drawing Figure

PATENTED AUG 20 1974 3,831,181
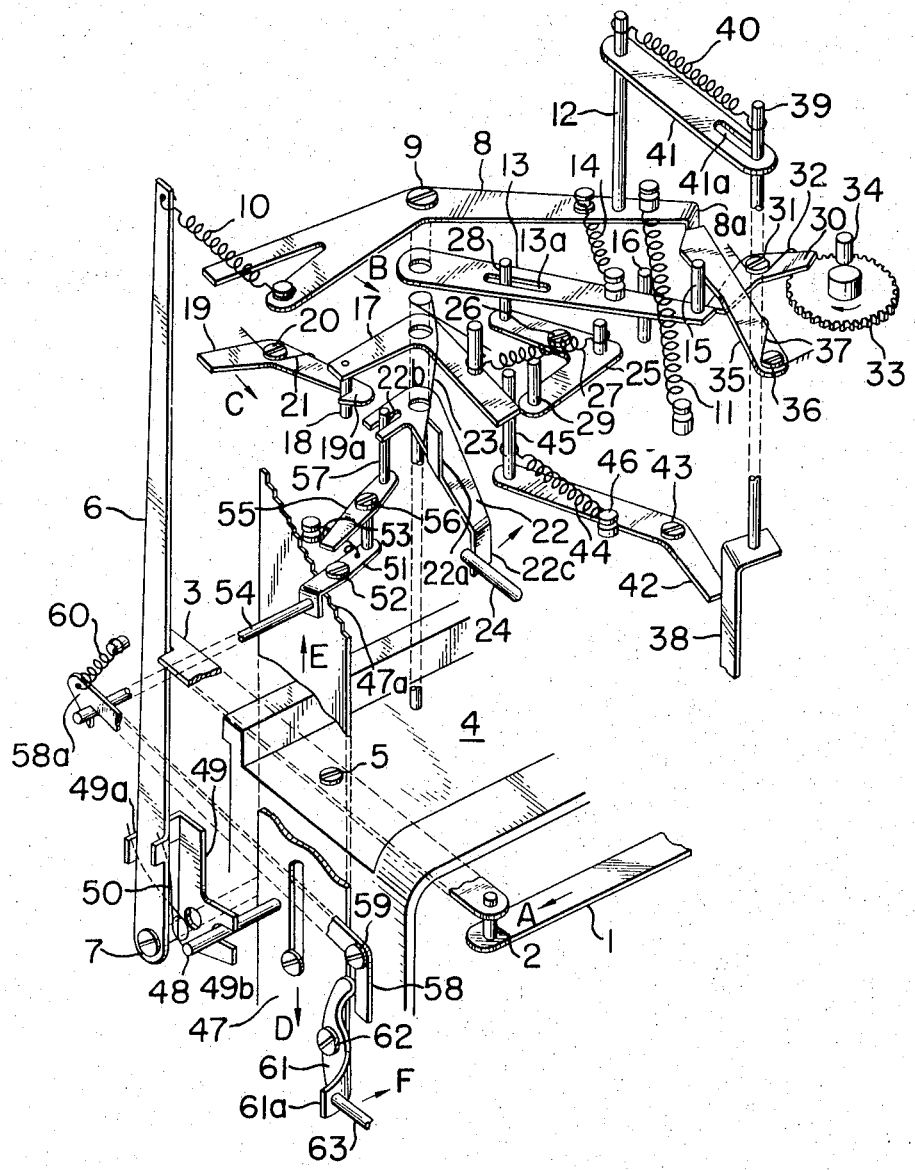

3,831,181

DEVICE FOR CONTROLLING DIAPHRAGM IN LENS OF SINGLE-LENS REFLEX CAMERA

BACKGROUND OF THE INVENTION

The present invention relates to an automatic diaphragm control device for a single-lens reflex camera in which a lever operatively coupled to a diaphragm in a lens may automatically set an aperture or f-number in case of taking a picture utilizing an electric eye system to be referred to as the "EE mode" in this specification.

In the conventional EE type — electric eye system — single-lens reflex camera, as shown in Japanese Pat. Publication No. 15727/1964, the depression of a shutter release button provides the force required for displacing a toothed stop ratchet plate to a position depending upon the angle of swing of a pointer of an exposure meter. When the shutter release button is further depressed, a member operatively coupled to a diaphragm comes into engagement with the toothed stop ratchet plate, and thereafter a mirror is raised and a shutter mechanism is actuated. The conventional diaphragm control device is, therefore, very complex in construction, and the force for depressing the shutter release button and the stroke thereof are rather greater than for a single-lens reflex camera without an exposure control system. Therefore a shutter chance is missed and the blurring of the picture as the result of the shaking of the camera tends to occur very often.

SUMMARY OF THE INVENTION

One of the objects of the present invention is therefore to provide an EE type single-lens reflex camera in which the stroke of a shutter release button is no longer than that of a single-lens reflex camera provided with no EE system.

Another object of the present invention is to provide an EE type single-lens reflex camera which has a very simple mechanism for controlling a diaphragm in a lens.

Briefly stated, opposed to the conventional EE type single-lens reflex camera in which a shutter release member directly actuates members for controlling a diaphragm, a shutter release member in accordance with the present invention only releases a start lever which in turn actuates component parts of an exposure control mechanism.

According to the present invention and in order to provide a simple exposure control mechanism, a diaphragm control member functions in unison with a member which operatively engages with a toothed stop ratchet plate in case of the EE mode, but is disconnected from the ratchet plate in case of the manual mode.

The above and other objects, features and advantages of the present invention will become more apparent from the following description of one preferred embodiment thereof taken in conjunction with the accompanying drawing.

BRIEF DESCRIPTION OF THE DRAWING

The single FIGURE is an exploded perspective view of an automatic diaphragm control device in accordance with the present invention looking from the bottom of a camera, the component parts being in the charged or energized state.

DESCRIPTION OF THE PREFERRED EMBODIMENT

The single FIGURE shows the component parts of the automatic diaphragm control device in accordance with the present invention when viewed from the bottom of a camera when the latter is charged for EE photography.

A release lever 1 which is operatively coupled to a shutter release button (not shown) is displaced in the direction indicated by the arrow A when the shutter button is depressed. A first stop lever 3 which is pivoted with a pivot pin 5 to the bottom of a mirror box 4 has its one end operatively coupled with a pin 2 to the release lever 1 and its other end engaged with a start lever 6 which is pivoted with a pivot pin 7 to one side wall of the mirror box 4. The start lever 6 is shown as being in the charged or energized state. A charge lever 8 which is pivoted to the bottom of the mirror box 4 with a pivot pin 9 has a spring 10 loaded between the start lever 6 and the charge lever 8 and another spring 11 loaded between the charge lever 8 and a stationary member of the camera so that the charge lever 8 is normally biased in the clockwise direction. When the film is advanced, the charge lever 8 is caused to rotate in the direction indicated by the arrow B so that the springs 10 and 11 are charged. A return lever 13 which is also pivoted to the bottom of the mirror box 4 with the pivot pin 9 has a spring 14 loaded between the return lever 13 and the charge lever 8 so that the return lever 13 is normally biased in the counterclockwise direction. The return lever 13 has an elongated slot 13a into which is fitted a pin 28 extended from one end of an auxiliary return lever 25 to be described hereinafter. A pin 15 extending from one end of the return lever 13 engages with a stop pin 16 extended from the stationary member of the camera when the return lever 13 is rotated in the counterclockwise direction so that the angle of rotation thereof may be limited. A main lever 17 which is also pivoted to the bottom of the mirror box 4 with the pivot pin 9 coaxially of the charge lever 8 and the return lever 13 has a pin 18 extended downwardly from one end thereof so as to engage with a hook shaped end 19a of a second stop lever 19 which is pivoted to the bottom of the mirror box 4 with a pivot pin 20. A spring 21 is loaded between the second stop lever 19 and the stationary member of the camera so that the second stop lever is normally biased in the clockwise direction. When the shutter is released, the start lever 6 engages with the other end of the second stop lever 19 so that the latter is caused to rotate in the direction indicated by the arrow C, thereby releasing the main lever 17.

A diaphragm control lever 22 which is pivoted also with the pivot pin 9 to the bottom of the mirror box 4 has a spring 23 loaded between the main lever 17 and the control lever 22 so that the latter is biased to normally rotate in the counter-clockwise direction, but the rotation is stopped as an upright extension 22a engages with the main lever 17. One arm 22b of the control lever 22 is bifurcated, and a downwardly bent portion 22c engages with a pin 24 extended from a lens. The auxiliary return lever 25 is pivoted with a pivot pin 26 to the bottom of the mirror box 4 and has a spring 27 loaded between the auxiliary return lever 25 and the main lever 17. A pin 29 is extended upwardly from the other end of the auxiliary return lever 25. Since the pin 28 at one end of the lever 25 is fitted loosely into the elongated slot 13a of the return lever 13, the lever 25 is caused to rotate as the return lever 13 is rotated.

A third stop lever 30 which is pivoted with a pivot pin 31 to the bottom of the mirror box 4 has a spring 32 so that it is normally biased in the clockwise direction. One end of the third stop lever 30 engages with the free end of the return lever 13 while the other end is adapted to engage with a pin 34 extended from a pinion 33 operatively coupled to a second shutter blind when the shutter operation is accomplished so that the third stop lever 30 is caused to rotate in the counterclockwise direction.

A fourth stop lever 35 which has its one end pivoted with a pivot pin 36 to the bottom of the mirror box 4 is normally biased to rotate in the counterclockwise direction under the force of a spring 37 so that the free end of the fourth stop lever 35 engages with a downwardly bent end portion 8a of the charge lever 8, thereby holding the lever 8 in the charged or energized state. A mirror actuating lever 38 has a pin 39, and a spring 40 is loaded between this pin 39 and a pin 12 extended from the charge lever 8. The mirror actuating lever 38 is operatively coupled to the charge lever 8 through a connecting lever 41 which has an elongated slot 41a into which is loosely fitted the pin 39 of the mirror actuating lever 38.

A fifth stop lever 42 is pivoted with a pivot pin 43 to the bottom of the mirror box 4, and a spring 44 is loaded between a pin 45 extending from one end of the lever 42 and a pin 46 extending from the stationary member of the camera so that the lever 42 is normally biased in the counterclockwise direction. The rotation of the fifth stop lever 42 in the counterclockwise direction is limited by the stopper pin 46. The pin 45 of the lever 42 is adapted to engage with the main lever 17 while the other end of the lever 42 engages with the mirror actuating lever 38.

A toothed stop ratchet plate 47 which is vertically slidable along one side wall of the mirror box 4 has a toothed stop ratchet portion (not shown) which engages with a needle of an exposure meter so as to determine the position of the vertically slidable ratchet plate 47 depending upon the brightness of a subject to be photographed. The ratchet plate 47 is provided with a stepwise toothed portion 47a which engages with a pawl end of a diaphragm control pawl lever 55 to be described hereinafter. A ratchet plate drive lever 49 which is pivoted to the mirror box 4 with the pivot pin 7 coaxially of the start lever 6 is normally biased to rotate in the clockwise direction under the force of a spring 50 loaded between the start lever 6 and the drive lever 49. The drive lever 49 has a bent end portion 49a in engagement with the start lever 6 and a bifurcated portion 49b in engagement with a connecting pin 48 extended from the ratchet plate 47.

A switching lever 51 which is pivoted with a pivot pin 52 to the bottom of the mirror box 4 is normally so biased as to rotate in the counterclockwise direction under the force of a spring 53 loaded between the lever 51 and the stationary member of the camera. A pin 54 which extends from a bent end portion of the switch lever 51 engages with a hook end portion 58a of a sixth stop lever 58 to be described hereinafter. The pawl lever 55 which is pivoted with a pin 56 to the end of the switching lever 51 remote from the bent end portion has a pin 57 extending from the other end thereof and engaging the bifurcated end 22b of the diaphragm control lever 22. The angle of rotation of the pawl lever 55 is controlled by the engagement of the pawl end thereof with the stepwise toothed portion 47a of the ratchet plate 47.

The sixth stop lever 58 which is pivoted with a pivot pin 59 to the one side wall of the mirror box 4 is normally so biased under the force of a spring 60 as to rotate in the clockwise direction. A mode lever 61 which is pivoted with a pivot pin 62 to the one side wall of the mirror box 4 has an upper end engaged with the lower end of the sixth stop lever. A curved lower end portion 61a of the mode lever 61 is adapted to engage with an f-number pin 63 connected to an aperture setting ring on the lens in case of the EE photography mode so that the mode lever 61 is caused to rotate in the clockwise direction. As a result the sixth stop lever 58 is caused to rotate in the counterclockwise direction against the spring 60 so that the pin 54 of the switching lever 51 is held in the position shown.

Next the mode of operation will be described. In the EE mode, the component parts are all charged or energized. Upon depression of the shutter release button (not shown), the release lever 1 is caused to displace in the direction indicated by the arrow A to cause the first stop lever 3 to rotate in the clockwise direction, thereby releasing the start lever 6. The start lever 6 is rotated in the clockwise direction under the force of the spring 10 so that the ratchet plate drive lever 49 is also rotated in the clockwise direction to displace the stop ratchet plate 47 in the direction indicated by the arrow D until its toothed ratchet portion engages with the needle of the exposure meter. Thus the stroke of the stop ratchet plate 47 is determined depending upon the brightness of the subject.

Thereafter the start lever 6 is further rotated to store the energy in the spring 50, and engages with the other end of the second stop lever 19 to cause the latter to rotate in the direction indicated by the arrow C against the spring 21. As a result the main lever 17 is released and rotated in the counterclockwise direction under the force of the spring 27 so that the diaphragm control lever 22 is also rotated in the counterclockwise direction. As a result the pawl lever 55 is rotated in the clockwise direction until the pawl end engages with the stepwise toothed portion 47a of the stop ratchet plate 47. Therefore the rotation of the lever 22 is also stopped so that the angular position of the diaphragm pin 24 is determined. Thus the diaphragm on the side of the lens is set to an aperture depending upon the angle of swing of the pointer of the exposure meter, that is the brightness of the subject.

The main lever 17 is further rotated until it engages with the pin 29. Toward the end of the rotation of the main lever 17, it engages with the pin 45 of the fifth stop lever 42 so that the latter is rotated in the clockwise direction against the spring 44. As a result the mirror actuating lever 38 is released to actuate a mechanism (not shown) under the force of the spring 40, thereby raising a mirror (not shown) out of the optical path to a film (not shown). Thereafter a conventional focal plane shutter is released in a manner well known in the art.

Upon completion of the operation of the focal plane shutter, the pin 34 of the gear 33 engages with the third stop lever 30 to cause it to rotate in the counterclockwise direction so that the return lever 13 is rotated in the counterclockwise direction under the force of the spring 14 until it engages with the stopper pin 16. Thus the auxiliary return lever 25 is caused to rotate in the clockwise direction to rotate the main lever 17 also in the clockwise direction while compressing the spring 27. Thus the fifth stop lever 42 is released from the main lever 17 to engage with the mirror actuating lever 38. When the main lever 17 engages with the bent portion 22a of the diaphragm control lever 22 the latter is also rotated in the clockwise direction in unison with the main lever 17 so that the diaphragm pin 24 is displaced to make the diaphragm wide opened.

At the end of rotation of the return lever 13, its pin 15 engages with the fourth stop lever 35 to cause the latter to rotate in the clockwise direction, thereby releasing the charge lever 8. Therefore the charge lever 8 is caused to rotate in the clockwise direction under the force of the spring 11 so that its bend end portion 8a causes the return lever 13 to rotate in the clockwise direction to the position at which the return lever 13 is engaged with and held in position by the third stop lever 30. The other end of the charge lever 8 causes the start lever 6 to rotate in the counterclockwise direction to the position at which the start lever 6 engages with the first stop lever 3 to be held in the initial position.

When the start lever 6 is rotated in the counterclockwise direction, the stop ratchet plate driving lever 49 is also rotated in the counterclockwise direction to displace the stop ratchet plate 47 in the direction indicated by the arrow E. As a result the pointer of the exposure meter is released from the toothed portion of the ratchet plate 47.

When the charge lever 8 is rotated in the clockwise direction, the pin 39 of the mirror actuating lever 38 fitted into the elongated slot 41a of the connecting lever 41 is displaced so that the mirror actuating lever 38 is returned to its initial position to lower the mirror and engages with the fifth stop lever 42.

When the shutter release button is released, the release lever 1 is displaced to the right to cause the first stop lever 3 to rotate in the counterclockwise direction, thereby holding the start lever in its initial position. Thus the film may be advanced again.

When the film is advanced with the component parts being in the positions shown in the FIGURE, the charge lever 8 is rotated in the direction indicated by the arrow B so that the bent portion 8a engages with the fourth stop lever 35 and the springs 10, 11, 14 and 40 are charged for the next photography.

In the case of use in the manual mode, the aperture setting ring on the lens is rotated to a desired f-number so that the pin 63 is displaced in the direction indicated by the arrow F to release the mode lever 61. As a result the sixth stop lever 58 is rotated in the clockwise direction under the force of the spring 60 to release the switching lever 51. When the shutter release button is depressed, the switching lever 51 is caused to rotate in the clockwise direction against the spring 53 after the pawl lever 55 has engaged with the stepwise toothed portion 47a of the stop ratchet plate 47. Therefore the pivot pin 56 of the pawl lever 55 is displaced to the right in the FIGURE so that the control lever 22 is permitted to rotate to the angular position corresponding to the minimum aperture. As a result the aperture is set independently of the position of the control lever 22.

What is claimed is:

1. A device for controlling a diaphragm on the side of a camera lens during automatic or manual exposure regulation comprising
    a. a start lever which is brought to a charged position when a film is advanced and is released when a shutter is released,
    b. a toothed stop ratchet plate whose displacement is controlled in response to the angle of swing of a pointer of an exposure meter, thereby controlling an aperture of the camera lens,
    c. a ratchet plate driving lever for driving said toothed stop ratchet plate in response to the actuation of said start lever,
    d. a main lever which is actuated in response to the actuation of said start lever,
    e. a diaphragm control lever actuated in response to the actuation of said main lever, thereby permitting the rotation of a pin operatively coupled to the diaphragm to set an aperture,
    f. a diaphragm control pawl lever actuated in response to the actuation of said diaphragm control lever, the angle of rotation of said diaphragm control pawl lever being controlled by said stop ratchet plate, thereby controlling the angle of rotation of said diaphragm control lever,
    g. a switching lever to hold in a predetermined position the axis of rotation of said pawl lever during automatic exposure regulation so that the angle of rotation of said pin coupled to the diaphragm may be controlled in response to the angle of swing of the pointer of said exposure meter, said switching lever causing the axis of rotation of said pawl lever to shift during manual exposure regulation so that said pin coupled to the diaphragm may be released from said diaphragm control lever and an aperture may be set by a control member on the side of the camera lens, and
    h. a mirror actuating lever which is released at the end of the rotation of said main lever.

2. A device as defined in claim 1 wherein said switching lever is held in position by a lever and is released during manual exposure regulation.

* * * * *

UNITED STATES PATENT OFFICE
CERTIFICATE OF CORRECTION

Patent No. 3,831,181　　　　　　　　Dated August 20, 1974

Inventor(s) SHOZO NOZAWA

It is certified that error appears in the above-identified patent and that said Letters Patent are hereby corrected as shown below:

Cover Page, after Item "[21]" insert Item [30] reading as follows:

--Foreign Application Priority Data

Oct. 19, 1972　Japan .................... 104019/1972--

Signed and sealed this 10th day of December 1974.

(SEAL)
Attest:

McCOY M. GIBSON JR.　　　　　　　C. MARSHALL DANN
Attesting Officer　　　　　　　　Commissioner of Patents